Figure 1:
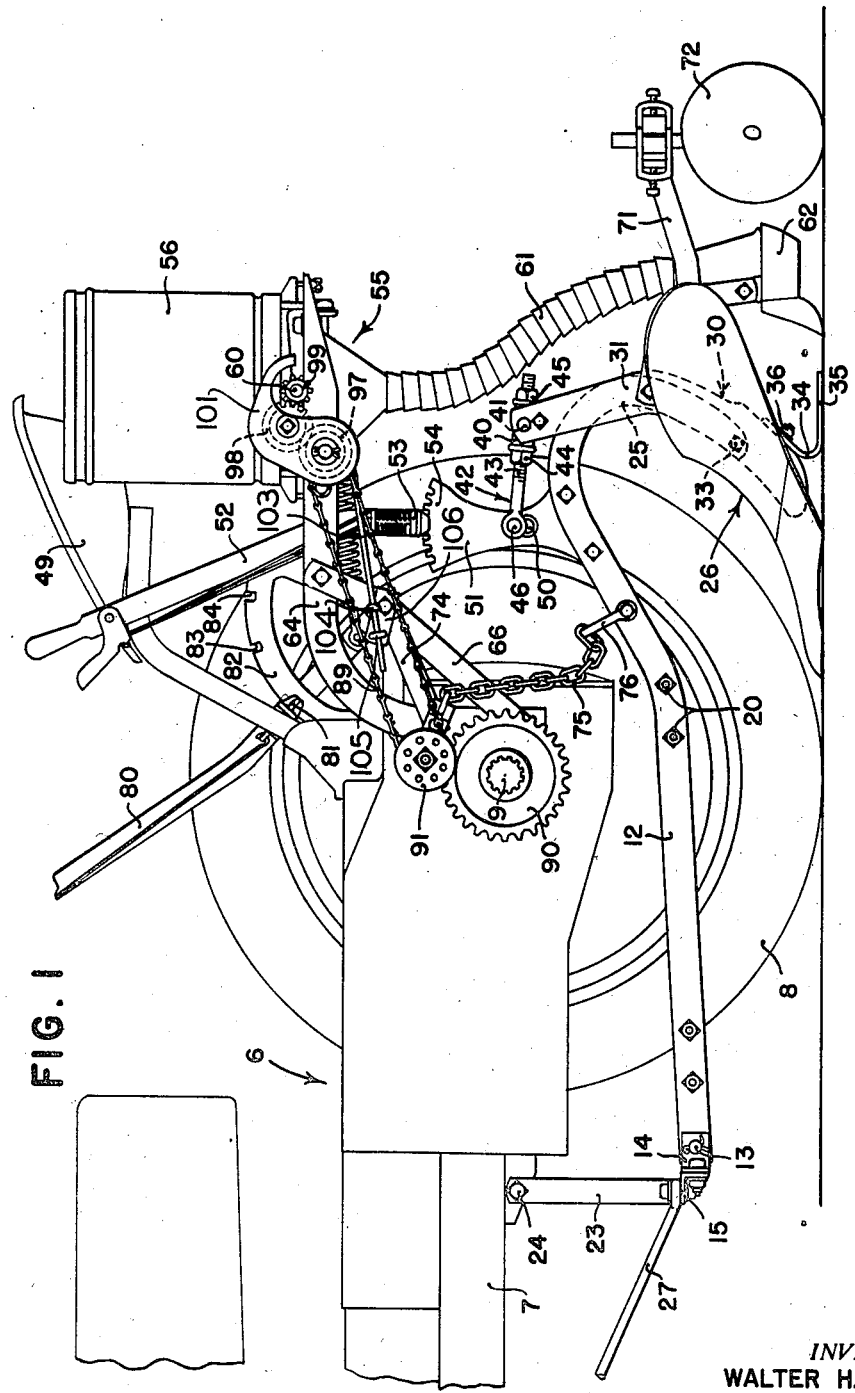

May 4, 1943.  W. H. SILVER  2,318,561
LISTER
Filed Aug. 26, 1939   2 Sheets-Sheet 1

INVENTOR:
WALTER H. SILVER
BY
ATTORNEYS.

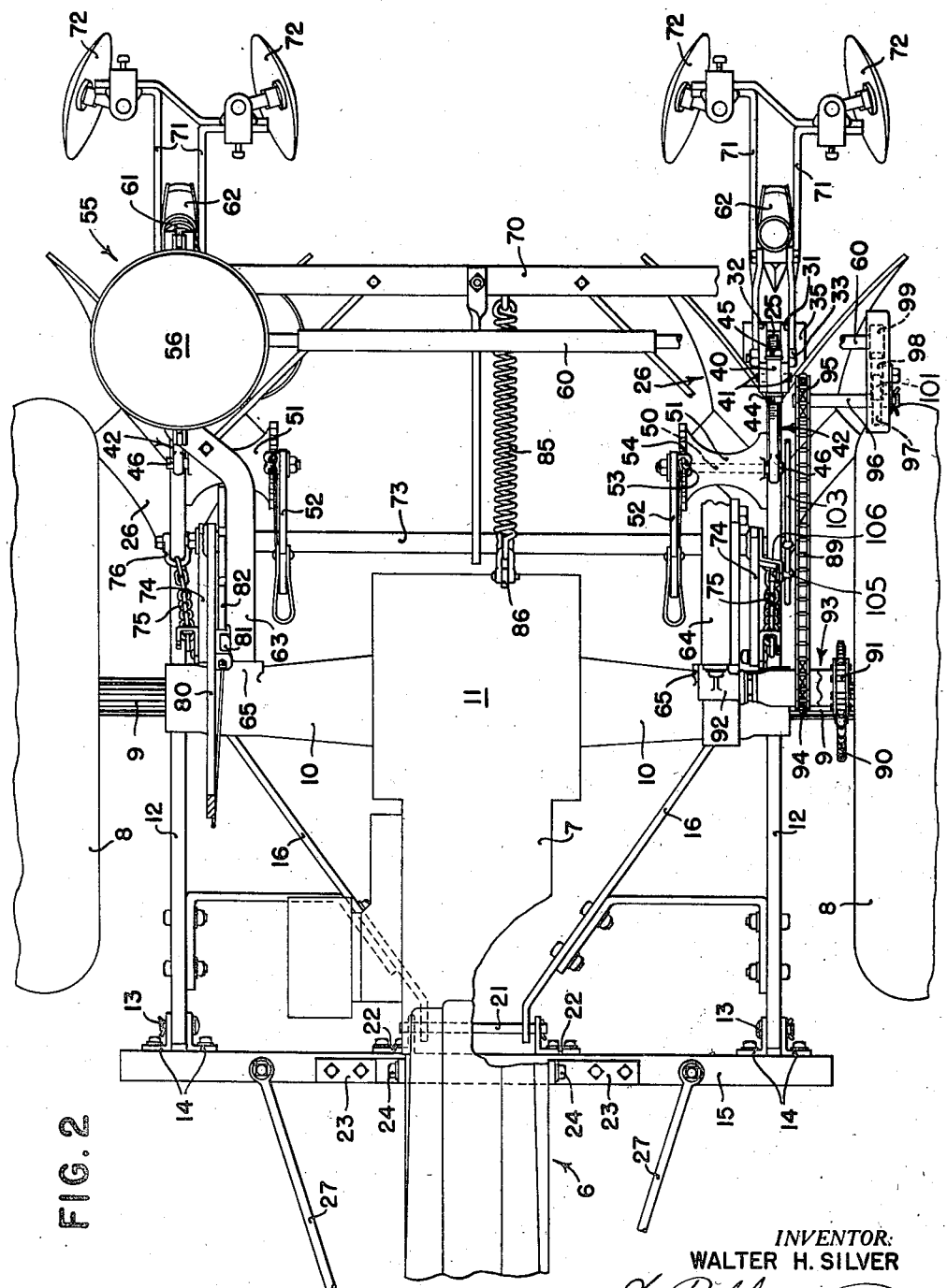

Patented May 4, 1943

2,318,561

UNITED STATES PATENT OFFICE 2,318,561

LISTER

Walter H. Silver, Moline, Ill., assignor to Deere & Company, Moline, Ill., a corporation of Illinois Application August 26, 1939, Serial No. 292,116

9 Claims. (Cl. 111—59)

The present invention relates to agricultural implements such as listers, plows, and the like, and has for its principal object the provision of new and improved means for controlling the working depth of the furrow forming tool thereof. More specifically, it is the object of this invention to provide means for controlling the working depth of a lister bottom or plow body by changing the angle of the tool with respect to its supporting beam.

Heretofore it has been customary to provide such furrow forming implements with gauge wheels which are connected with the tool carrying beam by vertically adjustable means such as crank axles or the like, and which run on the surface of the ground closely adjacent the tool. While such gauge wheels have been in use for a number of years and have performed more or less satisfactorily, it has been generally recognized that they have certain disadvantages, one of which derives from the fact that the depth of the furrow is considerably influenced by irregularities and obstacles on the surface of the ground. For example, if the gauge wheel runs over a rock or other obstacle, it tends to wrench the plow out of the ground, imposing excessive loads on the structure and sometimes causing damage to the implement. Likewise, if the surface of the ground is extremely soft the gauge wheel tends to dig in, causing the plow to run deeper than is desired. In view of the above, it is another object of the present invention to provide depth gauging means wherein the usual gauge wheel is replaced by a shoe or other member engaging the bottom of the furrow and which is, therefore, uninfluenced by the condition of the surface of the ground.

Another object is to provide depth gauging means capable of extremely fine adjustment, thereby greatly increasing the range of work which can be successfully accomplished with a single furrow-forming tool.

Other objects and advantageous features will be made apparent to those skilled in the art after consideration of the following description of the preferred embodiment of my invention, reference being had to the appended drawings, in which Figure 1 is a side elevation of a tractor mounted two-row lister planter embodying the principles of my invention, the near wheel of the tractor being removed to show certain details of construction more clearly; and Figure 2 is a partially sectioned top plan view of the same.

Referring now to the drawings, the implement is mounted on a tractor 6 of conventional construction, having a frame or body 7 supported at the front end on dirigible wheels (not shown) and at the rear end on a pair of driving wheels 8. The driving wheels are mounted on transverse axles 9, and these are journaled in rear axle housings 10 projecting laterally from either side of the differential housing 11.

The lister comprises a pair of laterally spaced, fore and aft extending beams 12 positioned beneath the tractor body 7 and pivotally connected for vertical swinging at their front ends by pivots 13 to angle brackets 14 bolted or otherwise fixed to a transverse draft member 15. Bracing or stabilizing members 16 are fixed at 20 to the beams 12 and extend diagonally forward therefrom, being journaled at their front ends on a rod 21 supported on angle brackets 22 at the center of the draft member 15 coaxial with the pivots 13. Thus, each of the beams 12 is free to swing vertically about the transverse axis 13—21, while being held in an upright position against tilting laterally relative to the draft member 15 by the stabilizing member 16.

The draft member 15 is supported from the tractor by means of straps 23 which are connected by pivot bolts 24 to the tractor body and depend therefrom, the lower ends of the straps being bent outwardly and bolted to the top of the draft member. The draft member 15 is further connected with the tractor by forwardly extending pull bars 27 which may be connected at their front ends either directly or through a spring cushion hitch to the forward portion of the tractor body. When used with a spring hitch, the draft member 15 and supporting straps 23 oscillate in a fore and aft direction about the pivot bolts 24, as is well understood in the art.

Each of the beams 12 has its rear end portion turned downwardly to form a shank 25 which extends down into the body of a lister plow bottom 26 and is attached thereto at its lower end in a manner to be described presently. The lister bottom is preferably, although not necessarily, of the double moldboard type and is secured in any suitable manner to a foot 30 comprising two parallel laterally spaced bars 31 and 32 disposed on either side of the shank 25 and extending upwardly at a slight forward angle from the lister bottom 26. The foot 30 is pivotally connected to the lower end of the shank 25 by a transverse pivot bolt 33 positioned at or near the center of load of the lister bottom 26, the bolt 33 providing for vertical rocking or tilting movement of the lister bottom relative to the draft beam 12. By locating the bolt 33 near the load center of the lister bottom 26, it is possible to reduce or even eliminate entirely the tendency of the lister bottom to swing under the pivot 33 due to unbalanced pressure of the earth against the tool in resisting passage of the lister bottom. One important advantage of this is that it allows the operator to rock the lister bottom 26 about its transverse pivot 33 while the implement is in operation. A gauge shoe 34 having a horizontal runner portion 35 adapted to bear downwardly against the bottom of the furrow when the bottom is running level, is bolted at 36 to the back side of the foot 30 and is bodily movable with the lister bottom 26.

Angular adjustment of each of the lister bottoms 26 about its respective pivot bolt 33 is accomplished by means of linkage comprising a sleeve 40 disposed between the bars 31, 32 and having trunnions 41 on opposite sides thereof journaled in suitable holes provided in the bars. A link in the form of an eye bolt 42 has its threaded shank 43 slidably received by the sleeve 40 and is secured thereto by nuts 44 and 45 threaded onto the shank 43 at opposite ends of the sleeve 40. The eye of the bolt 42 is journaled on a crank 46 provided at the outer end of a transverse rock shaft 50 which is journaled on a bracket member 51 bolted to the beam 12. Fixed to the laterally inner end of each of the rock shafts 50 is an adjusting hand lever 52 extending upwardly to within convenient reach of the operator seated on the tractor seat 49. A latch 53 on the lever 52 engages a notched sector 54 on the bracket member 51 and locks the lever 52 in adjusted position. Thus, with the lever 52 and crank 46 arranged in the relation shown in the drawings, a rearward position of the lever 52 will cause the front end of the lister bottom to incline upwardly relative to the beam 12, while a forward position of the lever will cause the bottom to incline downwardly. A finer adjustment than that obtainable with the lever 52 and latch mechanism 53, 54 may be had by backing off one of the nuts 44, 45 and drawing the other nut tight, causing the sleeve 40 to move axially along the shank 43, and thereby change the angularity of the foot 30 and attached lister bottom 26 relative to the beam 12.

Mounted on the tractor above each of the lister bottoms 26 is a planting or seeding unit, indicated in its entirety by the reference numeral 55, comprising a seed can 56, suitable seed dropping mechanism (not shown) disposed at the bottom of the seed can and actuated by a transverse shaft 60, and a flexible spout 61 for conveying the seed from the dropping mechanism to a seeding shoe 62 fixedly mounted on the lister bottom 26 to the rear of the gauge shoe 34.

The planting units 55 are supported on the tractor by means of a frame consisting of a pair of members 63 and 64 which are detachably secured to rearwardly facing mounting bosses 65 formed integral with the axle housings 10, and extend upwardly and rearwardly therefrom. Bracing members 66 provide added rigidity to the members 63, 64 and prevent them from flexing under the load of their respective planting units 55. The bracing members are connected at their upper ends with the horizontal portions of the frame members 63 and 64 and at their lower ends with the lower ends of the vertical sections of the frame members 63 and 64. See Figure 1. The rear ends of the members 63, 64 are connected by a transverse frame bar 70, forming a rigid platform upon which the planting units are mounted in any usual manner.

The seeding shoes 62 are each carried between a pair of laterally spaced bars 71 which are fixed at their front ends to the bars 31, 32 of the foot 30 and extend rearwardly therefrom. Covering disks 72 may be connected to the rear ends of the bars 71 behind the seeding shoe 62, as shown, for the purpose of covering the seed with soil as the implement moves forwardly.

The lister bottoms 26, together with the attached seeding shoes and disks, are lifted out of the ground to transport position by means of a transverse rock shaft 73 which is journaled in suitable bearings provided on the bracing members 66. Forwardly extending arms 74 are fixed to the dock shaft 73 at each end thereof, and lifting chains 75 are attached to the front ends of the arms and to clevis members 76 connected with the beams 12.

The rock shaft 73 is rocked by means of a hand lever 80 which is fixed to the shaft near the right end thereof, and which has a latch 81 engageable with a notched sector 82 fixed to the frame member 63. In the construction illustrated, I provide two notches 83 and 84 in the sector; 83 being for the purpose of holding the lister bottoms 26 just clear of the ground, as when making a turn in the field at the end of a row, and 84 serving to hold the bottoms considerably higher for transport over highways or extremely rough ground. A counterbalancing spring 85 which is anchored at one end to the transverse bar 70 and fastened at the other end to a short lever arm 86 fixed to the rock shaft 73, exerts a force on the rock shaft tending to overcome a portion of the weight of the lister bottoms and thereby facilitating the operation of lifting the bottoms to transport position.

Power for driving the seeding mechanism drive shaft 60 may be taken from the tractor in any of the usual ways, and in this preferred embodiment I have elected to transmit power from one of the driving axles 9 which are splined to allow for shifting the wheels 8 therealong so as to increase or decrease the tread. To this end, a sprocket wheel 90 is mounted on the left axle 9 and drives a reel 91 journaled on a bearing support member 92 bolted to the frame member 64. The reel 91 is positioned on the frame member 64 so that when the latter is bolted to the mounting boss 65, the reel meshes in driving engagement with the sprocket 90, thereby providing a quickly detachable driving connection with the tractor engine. Power is transmitted through a slip clutch 93 of any suitable kind and drives a sprocket 94 which is also journaled on the bearing support member 92. A driving chain 89 is trained around the sprocket 94 and extends rearwardly therefrom to drive a second sprocket 95 fixed to a transverse shaft 96 which is journaled in suitable bearing means carried on the under side of the seeding mechanism 55. A sprocket gear 97 mounted on the laterally outer end of the shaft 96 transmits the drive to an idler gear 98, carried by a carrier 101 that is swingably or pivotally supported on the shaft 96, and thence to a final gear 99 mounted on the left end of the drive shaft 60. Swinging movement of the carrier 101 in a clockwise direction (Figure 1) carries the gear 98 into mesh with the gear 99, and swinging movement in the other direction acts to separate the gears 98 and 99, as will be clear from Figure 1. For automatically swinging the carrier 101 in a counterclockwise direction (Figure 1) when raising the bottoms into their transport position, I provide a rod 103 connected at its rear end with the carrier 101 in any suitable way, the forward end of the rod 103 carrying a stop 104 and extending through an eyebolt 105 carried by an arm 106 that is fixed to rock with the transverse rock shaft 73 (Figure 2).

The operation of my improved lister is as follows:

When it is desired to increase the working depth of either of the plow bottoms 26, the corresponding hand lever 52 is unlatched from its sector 54 and moved forwardly, then relatched with the sector. The immediate effect of this is to tilt the point of the plow bottom downwardly and to raise the gauge shoe 34 from the bottom of the furrow. The greater suction resulting from the downward tilt of the plow bottom, together with the loss of support from the gauge shoe 34, causes the bottom to dig deeper and the beam 12 to swing downwardly therewith about the axis 13—21 until the plow bottom 26 again reaches a level position at the lower depth. In this level position the gauge shoe 34 again rests on the bottom of the furrow and prevents the bottom from going deeper. Likewise, to decrease the working depth of the plow bottom, the lever 52 is moved rearwardly, raising the point of the plow and causing the gauge shoe to push down into the furrow bottom. The plow bottom and beam 12 swing upwardly about the axis 13—21 until the bottom again becomes level at the new working depth.

If it is found that one notch on the sector 54 gives too coarse an adjustment of the working depth, a finer adjustment can be secured by backing one of the nuts 44, 45 away from its respective end of the sleeve 43 and tightening the other nut. By this means it is possible to secure any working depth desired, thereby greatly increasing the usefulness of the implement when used with tractors of limited power. By rocking the hand lever 80 in a clockwise direction (Figure 1) the tools may be lifted into their intermediate position, with the detent 81 engaging the notch 83, or into their fully raised transport position, with the detent 81 engaging the notch 84. In the latter position, the arm 106 acts against the stop 104 and shifts the rod 103 rearwardly, thus rocking the carrier 101 in a counterclockwise direction (Figure 1) and thereby disengaging the drive by separating the gear 98 from the gear 99.

What I claim as my invention is:

1. An implement comprising, in combination, a wheel supported frame, a fore and aft extending beam pivotally connected at its front end with said frame for vertical swinging movement, a furrow forming tool disposed at the rear end of said beam, means pivotally connecting said beam to said tool near the load center thereof for rocking movement about a transverse axis, said tool having a forwardly directed point and relatively flat ground engaging means spaced rearwardly therefrom adapted to bear against the bottom of the furrow when the tool is level, and control means operable to rock said tool about said transverse axis whereby said tool point is elevated or depressed with respect to said ground engaging means.

2. An implement comprising a fore and aft extending beam adapted for vertical swinging about its front end as a pivot, a ground working tool disposed near the rear end of said beam, pivot means connecting said tool with said beam near the center of load of the tool providing for rocking movement of the tool about a transverse axis, and means for rocking said tool about said transverse axis to change the working depth of the tool.

3. A planter comprising a wheel supported body, a fore and aft extending beam pivotally connected therewith for vertical swinging about a forward transverse axis, a furrow forming tool having suction and mounted on said beam for rocking movement about a transverse axis, means for rocking said tool and locking the same in adjusted position, ground engaging means fixed to and rockable with said tool, said means normally bearing against the bottom of the furrow and fixed to said tool in a position rearwardly of the forward part thereof so that when said beam swings about said forward transverse axis, said ground engaging means moves vertically through a greater distance than the forward part of said tool, thus limiting the depth of penetration of said tool by contact with the bottom of the furrow opened thereby, seed dropping mechanism rigidly mounted on said body, a seeding shoe fixed to said tool adjacent said ground engaging means, so as to deposit seed at substantially a uniform depth relative to the portion of the furrow traversed by said ground engaging means, and flexible conduit means between said seed dropping mechanism and said seeding shoe.

4. For use with a tractor having a body, rear axles journaled thereon, and driving wheels mounted on said axles, an implement comprising a furrow forming tool, draft means connecting said tool with the tractor for relative vertical swinging and disposing said tool at a point spaced rearwardly of said axles, a planting unit comprising a supporting member adapted to be detachably mounted on the tractor body and including a portion extending rearwardly, seed dropping mechanism carried by the rearwardly extending portion of said supporting member, means for conveying the seed from said seed dropping mechanism and depositing the same in the furrow formed by said tool, and means for operating said seed dropping mechanism comprising a driving sprocket fixedly mounted on the tractor axle, a driven sprocket journaled on said supporting member and adapted to mesh in driving engagement with said driving sprocket, and an operating connection between said driven sprocket and said seed dropping mechanism.

5. A tractor planter comprising a tool beam pivotally connected therewith for generally vertical swinging movement about a transverse axis, a furrow forming tool having suction and connected with the beam for rocking movement about a transverse axis, means for rocking said tool about an axis, ground engaging means fixed to and rockable with said tool, said ground engaging means normally bearing against the bottom of the furrow and fixed to said tool in a position rearwardly of the forward part and operative to limit the depth of penetration of said tool by contact with the bottom of the furrow opened thereby, seeding means including a seeding shoe fixed to said tool adjacent said ground engaging means so as to deposit seed at substantially a uniform depth relative to the portion of the furrow traversed by said ground engaging means.

6. A tractor planter comprising a tool beam pivotally connected therewith for generally vertical swinging movement about a transverse axis forward of the rear wheels of the tractor, the rear end of said beam extending back of the rear of the tractor, a furrow forming tool having suction and connected with the rear end of the beam for rocking movement about a transverse axis, means for rocking said tool including a hand lever pivoted on the rear portion of the tool beam and extending upwardly back of the tractor, ground engaging means fixed to and rockable with said tool, said ground engaging means normally bearing against the bottom of the furrow and fixed to said tool in a position rearwardly of the forward part and operative to limit the depth of penetration of said tool by contact with the bottom of the furrow opened thereby seeding means including a seeding shoe fixed to said tool adjacent said ground engaging means so as to deposit seed at substantially a uniform depth relative to the portion of the furrow traversed by said ground engaging means.

7. A tractor propelled implement comprising a tool beam pivotally connected therewith for generally vertical swinging movement about a transverse axis forward of the rear wheels of the tractor, the rear end of said beam extending back of the rear of the tractor, a furrow forming tool having suction and connected with the rear end of the beam for rocking movement about a transverse axis, and means including a hand lever pivoted on the rear portion of the tool beam and extending upwardly back of the tractor for rocking said tool about an axis.

8. A tractor planter comprising a tool beam pivotally connected therewith for generally vertical swinging movement about a transverse axis, a furrow forming tool having suction and connected with the beam, ground engaging means fixed to and rockable with said tool and beam about said transverse axis, said ground engaging means normally bearing against the bottom of the furrow and fixed to said tool in a position rearwardly of the forward part and operative to limit the depth of penetration of said tool by contact with the bottom of the furrow opened thereby, seeding means including a seeding shoe fixed to said tool adjacent said ground engaging means so as to deposit seed at substantially a uniform depth relative to the portion of the furrow traversed by said ground engaging means.

9. An implement comprising a fore and aft extending beam adapted for vertical swinging about its front end as a pivot, a ground working tool disposed near the rear end of said beam, pivot means connecting said tool with said beam near the center of load of the tool providing for rocking movement of the tool about a transverse axis, movable adjusting means providing a relatively coarse adjustment for changing the position of said tool relative to said beam, and means providing a relatively fine adjustment connecting said movable means with said tool.

WALTER H. SILVER.